United States Patent
Yamate

(10) Patent No.: US 9,217,095 B2
(45) Date of Patent: Dec. 22, 2015

(54) ORGANIC-INORGANIC COMPLEX, AND COMPOSITION FOR FORMING SAME

(75) Inventor: Taiki Yamate, Chiba (JP)

(73) Assignee: Nippon Soda Co., Ltd., Tokyo (JP)

( * ) Notice: Subject to any disclaimer, the term of this patent is extended or adjusted under 35 U.S.C. 154(b) by 0 days.

(21) Appl. No.: 14/236,857

(22) PCT Filed: Aug. 8, 2012

(86) PCT No.: PCT/JP2012/005025
§ 371 (c)(1),
(2), (4) Date: Feb. 3, 2014

(87) PCT Pub. No.: WO2013/021631
PCT Pub. Date: Feb. 14, 2013

(65) Prior Publication Data
US 2014/0179857 A1 Jun. 26, 2014

(30) Foreign Application Priority Data

Aug. 11, 2011 (JP) .................. 2011-176258
Mar. 1, 2012 (JP) .................. 2012-045689

(51) Int. Cl.
C09D 143/04 (2006.01)
C08F 2/44 (2006.01)
C09D 5/00 (2006.01)
C09D 7/12 (2006.01)
C09D 133/14 (2006.01)

(52) U.S. Cl.
CPC .............. C09D 143/04 (2013.01); C08F 2/44 (2013.01); C09D 5/006 (2013.01); C09D 7/1266 (2013.01); C09D 133/14 (2013.01)

(58) Field of Classification Search
CPC .................................................. C09D 143/04
USPC ....................................................... 524/430
See application file for complete search history.

(56) References Cited

U.S. PATENT DOCUMENTS

2010/0036012 A1* 2/2010 Kimura et al. ............... 522/172
2013/0131245 A1* 5/2013 Yamate et al. ............... 524/264

FOREIGN PATENT DOCUMENTS

| CN | 101547947 | | 9/2009 |
|---|---|---|---|
| EP | 1849835 | A1 | 10/2007 |
| JP | 63-228525 | | 9/1988 |
| JP | 6-9728 | | 1/1994 |
| JP | 06-018706 | | 1/1994 |
| JP | 7-10908 | | 1/1995 |
| JP | 10-020103 | | 1/1998 |
| JP | 11-124467 | | 5/1999 |
| JP | 11-326608 | | 11/1999 |
| JP | 2000-297126 | | 10/2000 |
| JP | 2001-214092 | | 8/2001 |
| JP | 2002-235018 | | 8/2002 |
| JP | 2005-272702 | | 10/2005 |
| JP | 2010-202860 | | 9/2010 |
| JP | 2012-212039 | | 11/2012 |
| WO | 2008/069217 | | 6/2008 |
| WO | WO 2012/017660 | * | 2/2012 |

OTHER PUBLICATIONS

International Search Report dated Nov. 27, 2012 issued in corresponding PCT Application No. PCT/JP2012/005025.
EP Communication with Supplementary European Search Report issued in EP Patent Appln. No. 12821721.3, dated Apr. 29, 2015, 5 pages.

* cited by examiner

*Primary Examiner* — Doris Lee
(74) *Attorney, Agent, or Firm* — Kenyon & Kenyon, LLP

(57) ABSTRACT

The organic-inorganic complex of the present invention is made using an organic-inorganic complex-forming composition containing the following components a) to c): a) at least one organic silicon compound represented by the formula (I) $R_nSiX_{4-n}$ and in which a molar ratio of an organic silicon compound in which a solubility parameter of R (SP1) obtained by a Fedors' estimation method is smaller than a solubility parameter of an electromagnetic ray-curable compound (SP2) obtained by the Fedors' estimation method and a difference between the SP1 and the SP2 is 2.0 or more (Si1) to an organic silicon compound in which SP1 is smaller than SP2 and a difference between the SP1 and the SP2 is less than 2.0 or an organic silicon compound in which SP1 is larger than SP2 (Si2) (Si1:Si2) is within the range of 8:2 to 10:0, and/or a condensate of the organic silicon compound; b) an electromagnetic ray-curable compound; and c) metal compound particles.

9 Claims, No Drawings

ORGANIC-INORGANIC COMPLEX, AND COMPOSITION FOR FORMING SAME

TECHNICAL FIELD

The present invention relates to an organic-inorganic complex containing metal compound particles, and a composition for forming the same, and particularly to an organic-inorganic complex in which the carbon content on the surface side is lower than the carbon content inside and the surface is inorganic, the organic-inorganic complex having an unevenness on the surface by further containing metal compound particles, and a composition for forming the same. The metal compound particle-containing organic-inorganic complex of the present invention is preferably used as anti-glare films and the like provided on the surfaces of high definition image displays, such as CRTs and liquid crystal panels, used for the image display of computers, word processors, televisions, cellular phones, and the like.

This application is a national stage application of International Application No. PCT/JP2012/005025, filed Aug. 8, 2012, which claims priority to Japanese Patent Application No. 2011-176258 filed on Aug. 11, 2011, and Japanese Patent Application No. 2012-045689 filed on Mar. 1, 2012, the contents of which are incorporated herein.

BACKGROUND ART

For anti-glare films, a type in which an unevenness shape is formed on the surface of an anti-glare layer by the aggregation of particles, such as aggregative silica, a type in which a filler having a particle diameter equal to or more than the film thickness of a coating film is added to a resin to form an unevenness shape on a layer surface, and a type in which a film having an unevenness is laminated on a layer surface to transfer the unevenness shape are known. (See Patent Documents 1 and 2)

A problem of conventional anti-glare films is that the unevenness shape of the surface is made large, and therefore, the haze value decreases. A further problem is that the film surface glitters, and the visibility decreases.

On the other hand, there is known an anti-glare film obtained by laminating at least a transparent base material film and an anti-glare layer comprising at least one type of light-transmitting fine particles in a light-transmitting resin, wherein the above light-transmitting fine particles have a particle diameter of 0.5 to 5 µm, the difference in refractive index between the above light-transmitting fine particles and the above light-transmitting resin is 0.02 to 0.2, and 3 or more and less than 30 parts by weight of the above light-transmitting fine particles is blended based on 100 parts by weight of the above light-transmitting resin (see Patent Document 3). The document discloses that as the light-transmitting fine particles, plastic beads are preferred, specifically, melamine beads (refractive index: 1.57), acrylic beads (refractive index: 1.49), acrylic-styrene beads (refractive index: 1.54), polycarbonate beads, polyethylene beads, polystyrene beads, polyvinyl chloride beads, and the like are illustrated, and an inorganic filler can also be added.

On the other hand, for hard coating films, the use of acrylate-based resins or the like as UV-curable resins is known. For example, Patent Document 4 describes a hard coating film containing a (meth)acrylate mixture (A), a photopolymerization initiator (B), an ethylenic unsaturated group-containing urethane oligomer (C), a colloidal silica sol (D), and a diluent (E), and describes that the obtained film has good pencil hardness, curl, and adhesiveness to a base material.

In addition, Patent Document 5 describes the use of a curable composition containing (A) particles obtained by bonding particles of an oxide of at least one element selected from the group consisting of silicon, aluminum, zirconium, titanium, zinc, germanium, indium, tin, antimony, and cerium to an organic compound comprising a polymerizable unsaturated group, (B) a compound having a urethane bond and two or more polymerizable unsaturated groups in the molecule, and (C) a photopolymerization initiator, and describes that the curable composition has excellent coating properties and can form on the surfaces of various base materials a coating film (coating) having high hardness and a high refractive index and having excellent abrasion resistance and excellent adhesiveness to base materials and low refractive index layers.

Further, Patent Document 6 describes an ultraviolet-curable hard coating resin composition obtained by blending (A) a mixture of a hydrolysate of an organic silicon compound and metal oxide fine particles, (B) a polyfunctional acrylate or methacrylate, and (C) a photopolymerization initiator, and describes that the bleeding of the antistatic agent on the surface, a decrease in transparency, a deterioration in moisture resistance, and the like can be kept within practically allowable ranges, and functions (abrasion resistance, surface hardness, moisture resistance, solvent and chemical resistance, and the like) as a hard coating are satisfied.

However, these hard coating films using acrylate-based resins and the like have poorer wear resistance than inorganic films, and therefore, a metal oxide sol having high hardness is added for improvement. But, in this method, the surfaces of the metal oxide particles are covered with a large amount of the resin, and a sufficient effect cannot always be expected. Particularly, in the case of anti-glare films that contain metal oxide particles having a large particle diameter to form an unevenness on the surfaces of the films, a problem is that unless the surfaces of the metal oxide particles are covered with the resin, the metal oxide particles having a large particle diameter fall off in a wear test.

For these problems, the inventors have already found that an organic-inorganic complex in which the surface has very high hardness and which has excellent adhesiveness to a substrate and excellent moisture resistance can be produced by blending an ultraviolet-curable compound into a polysiloxane-based organic-inorganic complex (Patent Document 7). However, the light reflection properties of the above organic-inorganic complex have not been studied.

Therefore, the present inventors have developed an organic-inorganic complex in which the ten-point average roughness of the organic-inorganic complex surface is 0.1 µm to 5 µm, by using metal oxide particles having a primary particle diameter of 0.05 µm to 0.2 µm (Patent Document 8). The performance as an anti-glare film has been sufficient, but a problem has been that the performance may not be exhibited depending on the substrate on which the film is formed.

PRIOR ART DOCUMENTS

Patent Documents

Patent Document 1: Japanese unexamined Patent Application Publication No. 6-18706
Patent Document 2: Japanese unexamined Patent Application Publication No. 10-20103
Patent Document 3: Japanese unexamined Patent Application Publication No. 11-3265608
Patent Document 4: Japanese unexamined Patent Application Publication No. 2002-235018

Patent Document 5: Japanese unexamined Patent Application Publication No. 2005-272702
Patent Document 6: Japanese unexamined Patent Application Publication No. 2001-214092
Patent Document 7: WO2008/069217
Patent Document 10: Japanese unexamined Patent Application Publication No. 2010-202860

SUMMARY OF THE INVENTION

Object to be Solved by the Invention

It is an object of the present invention to provide anti-glare properties to a polysiloxane-based organic-inorganic complex in which the surface has higher hardness than the inside, to provide an organic-inorganic complex that has both high surface hardness and a low haze value, and can further prevent glare.

Means to Solve the Object

The present inventors have addressed the above object and studied diligently, and, as a result, found that an excellent organic-inorganic complex in which the surface has very high hardness and which simultaneously has excellent anti-glare properties, can prevent glare, and has a low haze value can be produced by further containing a mixture of metal oxide fine particles in which silica is mixed with at least one selected from zirconia, alumina, and titania, as metal compound particles, in an organic-inorganic complex in which a polysiloxane-based organic-inorganic complex consisting of a particular silicate and an electromagnetic ray-curable compound are blended, leading to the completion of the present invention.

In the present invention, the organic-inorganic complex does not encompass those in which an organic film and an inorganic film are separately formed.

Specifically, the present invention relates to
(1) an organic-inorganic complex-forming composition comprising:
a) at least one organic silicon compound represented by formula (I):

$$R_n SiX_{4-n} \qquad (I)$$

(wherein R represents an organic group having a carbon atom directly bonded to Si, and X represents a hydroxyl group or a hydrolyzable group; and n represents 1 or 2, wherein when n is 2, each R is the same or different, and when (4−n) is 2 or more, each X is the same or different) and wherein a molar ratio of an organic silicon compound in which a solubility parameter of R(SP1) obtained by a Fedors' estimation method is smaller than a solubility parameter of an electromagnetic ray-curable compound (SP2) obtained by the Fedors' estimation method and a difference between the SP1 and the SP2 is 2.0 or more (Si1) to an organic silicon compound in which SP1 is smaller than SP2 and a difference between the SP1 and the SP2 is less than 2.0 or an organic silicon compound in which SP1 is larger than SP2 (Si2) (Si1:Si2) is within the range of 8:2 to 10:0, and/or a condensate of the organic silicon compound;
b) an electromagnetic ray-curable compound; and
c) metal compound particles,
(2) the organic-inorganic complex-forming composition according to the above (1), wherein the electromagnetic ray-curable compound is 2 to 98% by mass based on a total mass of the solids,
(3) the organic-inorganic complex-forming composition according to the above (1) or (2), wherein the metal compound particles are a mixture of metal compound particles having an isoelectric point of less than 5 as a metal oxide and metal compound particles having an isoelectric point of larger than 5 as a metal oxide, and
(4) the organic-inorganic complex-forming composition according to the above (3), wherein an average particle diameter of primary particles of the metal compound particles having an isoelectric point of less than 5 as a metal oxide and/or the metal compound particles having an isoelectric point of larger than 5 as a metal oxide is within the range of 1 to 100 nm.

In addition, the present invention relates to
(5) an organic-inorganic complex comprising:
a) a condensate of at least one organic silicon compound represented by formula (I):

$$R_n SiX_{4-n} \qquad (I)$$

(wherein R represents an organic group having a carbon atom directly bonded to Si, and X represents a hydroxyl group or a hydrolyzable group; and n represents 1 or 2, wherein when n is 2, each R is the same or different, and when (4−n) is 2 or more, each X is the same or different) and wherein a molar ratio of an organic silicon compound in which a solubility parameter of R(SP1) obtained by a Fedors' estimation method is smaller than a solubility parameter of an electromagnetic ray-curable compound (SP2) obtained by the Fedors' estimation method and a difference between the SP1 and the SP2 is 2.0 or more (Si1) to an organic silicon compound in which SP1 is smaller than SP2 and a difference between the SP1 and the SP2 is less than 2.0 or an organic silicon compound in which SP1 is larger than SP2 (Si2) (Si1:Si2) is within the range of 8:2 to 10:0;
b) a cured product of an electromagnetic ray-curable compound; and
c) aggregates of metal compound particles,
(6) the organic-inorganic complex according to the above (5), wherein the cured product of the ultraviolet-curable compound is 2 to 98% by mass based on a total mass of the solids,
(7) the organic-inorganic complex according to the above (5) or (6), wherein the metal compound particles are a mixture of metal compound particles having an isoelectric point of less than 5 as a metal oxide and metal compound particles having an isoelectric point of larger than 5 as a metal oxide, and
(8) the organic-inorganic complex according to the above (7), wherein an average particle diameter of primary particles of the metal compound particles having an isoelectric point of less than 5 as a metal oxide and/or the metal compound particles having an isoelectric point of larger than 5 as a metal oxide is in the range of 1 to 100 nm.

Further, the present invention relates to
(9) a laminate obtained by applying an organic-inorganic complex-forming composition according to any one of the above (1) to (4) to a substrate.

The organic-inorganic complex of the present invention has excellent interlayer adhesiveness when various layers are laminated, because the surface has a SiO₂-like structure having high polarity. The organic-inorganic complex of the present invention can be easily subjected to various treatments, for example, the surface can also be subjected to silane coupling treatment, and thus, the surface is changed to be water repellent and oil repellent, and amino groups can be further introduced into a silane coupling agent to provide plating adhesiveness. In addition, the slip properties of the surface are good because of a surface unevenness due to the metal compound particles, and slip properties and water repellency and oil repellency can both be achieved. Therefore, the organic-inorganic complex of the present invention can be preferably used, for example, for a touch panel surface.

Further, the organic-inorganic complex of the present invention has the property of good moisture resistance. Generally, it is considered that when metal compound particles are added to a hard coating film, the moisture resistance is poor. But, the organic-inorganic complex of the present invention shows good moisture resistance though it contains metal compound particles.

In addition, as one preferred aspect of the mixture of metal compound particles of the present invention, the different types of metal compound particles are charged differently, positively and negatively, and form clusters (aggregates) due to an electrostatic effect, and therefore, even particles having a particle diameter equal to or less than the wavelength of visible light can exhibit anti-Newton ring properties, glare prevention, and further anti-glare properties by forming aggregates.

MODE OF CARRYING OUT THE INVENTION (Organic-Inorganic Complex-Forming Composition)
The organic-inorganic complex-forming composition of the present invention comprises:
a) at least one organic silicon compound represented by formula (I):

$$R_nSiX_{4-n} \quad (I)$$

(wherein R represents an organic group having a carbon atom directly bonded to Si, and X represents a hydroxyl group or a hydrolyzable group; and n represents 1 or 2, wherein when n is 2, each R is the same or different, and when (4−n) is 2 or more, each X is the same or different) and wherein a molar ratio of an organic silicon compound in which a solubility parameter of R(SP1) obtained by a Fedors' estimation method is smaller than a solubility parameter of an electromagnetic ray-curable compound (SP2) obtained by the Fedors' estimation method and a difference between the SP1 and the SP2 is 2.0 or more (Si1) to an organic silicon compound in which SP1 is smaller than SP2 and a difference between the SP1 and the SP2 is less than 2.0 or an organic silicon compound in which SP1 is larger than SP2 (Si2) (Si1:Si2) is within the range of 8:2 to 10:0 (hereinafter sometimes simply referred to as "an organic silicon compound"), and/or a condensate thereof;
b) an electromagnetic ray-curable compound; and
c) metal compound particles.
In addition, the organic-inorganic complex-forming composition of the present invention can comprise a silanol condensation catalyst, a photopolymerization initiator, and the like.

The solids (the organic silicon compound, the electromagnetic ray-curable compound, the metal compound particles, and the like) in the organic-inorganic complex-forming composition of the present invention are preferably 1 to 75% by mass, more preferably 10 to 60% by mass.
(Organic Silicon Compound)
In the formula (I) of the organic silicon compound of the present invention, R and X are each as follows.

R represents an organic group having a carbon atom directly bonded to Si. Examples of such an organic group can include hydrocarbon groups which may be substituted, and groups consisting of polymers of hydrocarbons which may be substituted. Specific examples include hydrocarbon groups having 1 to 30 carbon atoms which may be substituted. Straight chain or branched chain alkyl groups having 1 to 10 carbon atoms which may be substituted, alkyl groups having a chain longer than 10 carbon atoms, cycloalkyl groups having 3 to 8 carbon atoms which may be substituted, straight chain or branched chain alkenyl groups having 2 to 10 carbon atoms which may be substituted, or cycloalkenyl groups having 3 to 8 carbon atoms which may be substituted are preferred. In addition, the organic group may be a hydrocarbon group having an aromatic ring.

In addition, such an organic group may comprise an oxygen atom, a nitrogen atom, or a silicon atom, and may be a group comprising a polymer such as a polysiloxane, a polyvinylsilane, or a polyacrylsilane. Examples of the substituent can include a halogen and a methacryloxy group. Examples of the halogen include a fluorine atom, a chlorine atom, a bromine atom, and an iodine atom.

Alkyl groups having 1 to 10 carbon atoms include straight chain or branched chain alkyl groups having 1 to 10 carbon atoms. Examples of the alkyl groups having 1 to 10 carbon atoms include a methyl group, an ethyl group, a n-propyl group, an isopropyl group, a n-butyl group, an isobutyl group, a s-butyl group, a t-butyl group, a n-pentyl group, an isopentyl group, a neopentyl group, a 2-methylbutyl group, a 2,2-dimethylpropyl group, a n-hexyl group, an isohexyl group, a n-heptyl group, a n-octyl group, a nonyl group, an isononyl group, and a decyl group. Examples of the alkyl groups having a chain longer than 10 carbon atoms include a lauryl group, a tridecyl group, a myristyl group, a pentadecyl group, a palmityl group, a heptadecyl group, and a stearyl group.

Examples of the cycloalkyl groups having 3 to 8 carbon atoms include a cyclopropyl group, a cyclobutyl group, a cyclopentyl group, a cyclohexyl group, a cycloheptyl group, and a cyclooctyl group.

The straight chain or branched chain alkenyl groups having 2 to 10 carbon atoms mean straight chain or branched chain alkenyl groups having 2 to 10 carbon atoms that have a carbon-carbon double bond at any one or more sites. Examples of the straight chain or branched chain alkenyl groups having 2 to 10 carbon atoms include an ethenyl group, a prop-1-ene-1-yl group, a prop-2-ene-1-yl group, a prop-1-ene-2-yl group, a but-1-ene-1-yl group, a but-2-ene-1-yl group, a but-3-ene-1-yl group, a but-1-ene-2-yl group, a but-3-ene-2-yl group, a pent-1-ene-1-yl group, a pent-4-ene-1-yl group, a pent-1-ene-2-yl group, a pent-4-ene-2-yl group, a 3-methyl-but-1-ene-1-yl group, a hex-1-ene-1-yl group, a hex-5-ene-1-yl group, a hept-1-ene-1-yl group, a kept-6-ene-1-yl group, an oct-1-ene-1-yl group, and an oct-7-ene-1-yl group.

The cycloalkenyl groups having 3 to 8 carbon atoms mean alkenyl groups having 3 to 8 carbon atoms that have a carbon-carbon double bond at any one or more sites and have a cyclic moiety. Examples of the cycloalkenyl groups having 3 to 8 carbon atoms include a 1-cyclopenten-1-yl group, a 2-cyclopenten-1-yl group, a 1-cyclohexen-1-yl group, a 2-cyclohexen-1-yl group, and a 3-cyclohexen-1-yl group.

Examples of the hydrocarbon groups having an aromatic ring as $C_{6-10}$ aryl $C_{1-8}$ alkyl groups include a benzyl group, a phenethyl group, a 3-phenyl-n-propyl group, a 4-phenyl-n-butyl group, a 5-phenyl-n-pentyl group, a 8-phenyl-n-octyl group, and a naphthylmethyl group. Examples of the $C_{6-10}$ aryl $C_{2-6}$ alkenyl groups include a styryl group, a 3-phenyl-prop-1-ene-1-yl group, a 3-phenyl-prop-2-ene-1-yl group, a 4-phenyl-but-1-ene-1-yl group, a 4-phenyl-but-3-ene-1-yl group, a 5-phenyl-pent-1-ene-1-yl group, a 5-phenyl-pent-4-ene-1-yl group, a 8-phenyl-oct-1-ene-1-yl group, a 8-phenyl-oct-7-ene-1-yl group, and a naphthylethenyl group.

Examples of the groups having an oxygen atom include groups having an oxirane ring (epoxy group), such as an epoxy group, epoxyalkyl groups, and a glycidoxypropyl group, an acryloxymethyl group, and a methacryloxymethyl group.

As the epoxyalkyl groups among the groups having an oxygen atom, straight chain or branched chain epoxyalkyl groups having 3 to 10 carbon atoms are preferred. Examples of the epoxyalkyl groups include an epoxymethyl group, an epoxyethyl group, an epoxy-n-propyl group, an epoxyisopropyl group, an epoxy-n-butyl group, an epoxyisobutyl group, an epoxy-t-butyl group, an epoxy-n-pentyl group, an epoxyisopentyl group, an epoxyneopentyl group, an epoxy-2-methylbutyl group, an epoxy-2,2-dimethylpropyl group, and an epoxy-n-hexyl group. Examples of groups further having an oxygen atom in addition to an oxirane ring include a glycidoxypropyl group.

As the groups having a nitrogen atom, groups having —NR'$_2$ (wherein R' represents a hydrogen atom, an alkyl group, or an aryl group, and each R' is the same or different) or groups having —N=CR"$_2$ (wherein R" represents a hydrogen atom or an alkyl group, and each R" is the same or different) are preferred. Examples of the alkyl group include the same ones as the above. Examples of the aryl group include a phenyl group, a naphthyl group, an anthracen-1-yl group, and a phenanthren-1-yl group.

Examples of the groups having —NR'$_2$ include a —CH$_2$—NH$_2$ group, a —C$_3$H$_6$—NH$_2$ group, and a —CH$_3$—NH—CH$_3$ group. Examples of the groups having —N=CR"$_2$ include a —CH$_2$—N=CH—CH$_3$ group, a —CH$_2$—N=C(CH$_3$)$_2$ group, and a —C$_2$H$_5$—N=CH—CH$_3$ group.

Among the above, examples of groups decomposed by irradiation with light having a wavelength of 350 nm or less include groups having a vinyl group, groups having an oxirane ring, groups having —NR'$_2$ (wherein R' represents a hydrogen atom, an alkyl group, or an aryl group, and each R' is the same or different), or groups having —N=CR"$_2$ (wherein R" represents a hydrogen atom or an alkyl group, and R" is the same or different).

Here, examples of the groups having a vinyl group include groups having groups having alkenyl groups, such as an ethenyl group (vinyl group), a prop-2-ene-1-yl group, a but-3-ene-1-yl group, a pent-4-ene-1-yl group, a hex-5-ene-1-yl group, a kept-6-ene-1-yl group, and an oct-7-ene-1-yl group, vinylcarbonyl groups, such as a methacrylmethyl group, an acryloxymethyl group, and a methacryloxymethyl group, or the like. The groups having an oxirane ring, the groups having —NR'$_2$, and the groups having —N=CR"$_2$ are as described above.

In addition, in the formula (I) of the organic silicon compound, n represents 1 or 2, and n=1 is particularly preferred. When n is 2, each R is the same or different. In addition, one of these can be used alone, or two or more of these can be used in combination.

X represents a hydroxyl group or a hydrolyzable group. When (4−n) in formula (I) is 2 or more, each X is the same or different. The hydrolyzable group means, for example, a group that can be hydrolyzed by heating at 25° C. to 100° C. in the coexistence of excess water without a catalyst to produce a silanol group, or a group that can form a siloxane condensate. Specific examples of the hydrolyzable group can include alkoxy groups, acyloxy groups, halogen groups, and isocyanate groups. Alkoxy groups having 1 to 4 carbon atoms, or acyloxy groups having 1 to 6 carbon atoms are preferred.

Examples of the alkoxy groups having 1 to 4 carbon atoms include a methoxy group, an ethoxy group, a n-propoxy group, an isopropyloxy group, a n-butoxy group, an isobutoxy group, and a t-butoxy group. Examples of the acyloxy groups having 1 to 6 carbon atoms include an acetyloxy group and a benzoyloxy group. Examples of the halogens include a fluorine atom, a chlorine atom, a bromine atom, and an iodine atom.

In the organic silicon compound used in the present invention, the molar ratio of the organic silicon compound in which the solubility parameter of R(SP1) obtained by the Fedors' estimation method is smaller than the solubility parameter of the electromagnetic ray-curable compound (SP2) obtained by the Fedors' estimation method and the difference between the SP1 and the SP2 is 2.0 or more (Si1) to the organic silicon compound in which SP1 is smaller than SP2 and the difference between the SP1 and the SP2 is less than 2.0 or the organic silicon compound in which SP1 is larger than SP2 (Si2) (Si1:Si2) is in the range of 8:2 to 10:0, preferably 9:1 to 10:0.

If the ratio of Si1 to Si2 is smaller than 8:2, a problem is that unless the amount of the inorganic particles used is increased, sufficient anti-glare properties cannot be ensured, and in this case, the haze value increases.

Here, the solubility parameter (SP value) is calculated based on the following Fedors' estimation method.

Fedors' formula:

$$SP\ \text{value}(\delta)=(E_v/v)^{1/2}=(\Sigma\Delta e_i/\Sigma\Delta v_i)^{1/2}$$

$E_v$: evaporation energy
v: molar volume
$\Delta e_i$: the evaporation energy of an atom or atomic group of each component
$\Delta v_i$: the molar volume of each atom or atomic group For the evaporation energy and molar volume of each atom or atomic group used in the calculation of the above formula, R. F. Fedors, Polym. Eng. Sci., 14, 147 (1974) can be referred to.

Therefore, the organic silicon compound used in the present invention is different according to the type of the electromagnetic ray-curable compound used in the present invention. The solubility parameters (SP values) of organic silicon compounds and electromagnetic ray-curable compounds can be calculated based on the Fedors' estimation method, and therefore, the combination of the organic silicon compound and the electromagnetic ray-curable compound can be determined based on previously calculated SP values.

For example, when dipentaerythritol hexaacrylate (SP value: 10.4) is used as the electromagnetic ray-curable compound, examples of organic silicon compounds having an SP value smaller than the SP value of the electromagnetic ray-curable compound by 2.0 or more include methyltrichlorosilane, methyltrimethoxysilane, methyltriethoxysilane, methyltributoxysilane, ethyltrimethoxysilane, ethyltriisopropoxysilane, ethyltri(n-butoxy)silane, trifluoromethyltrimethoxysilane, dimethyldiaminosilane, dimethyldichlorosilane, dimethyldiacetoxysilane, dimethyldimethoxysilane, vinyltrimethoxysilane, methyltri(meth)acryloxysilane, methyltris[2-(meth)acryloxyethoxy]silane, methyltriglycidyloxysilane, methyltris(3-methyl-3-oxetanemethoxy)silane, vinyltrichlorosilane, vinyltriethoxysilane, n-butyltrimethoxysilane, di-n-butyldimethoxysilane (all of these have an SP value of 8.4 or less). Those in which in formula (I), n represents 1, and R has an organic group having 3 or less carbon atoms are preferred.

In addition, examples of the organic silicon compounds having an SP value smaller than the SP value of dipentaerythritol hexaacrylate that is the electromagnetic ray-curable compound by less than 2.0, or the organic silicon compounds having an SP value larger than the SP value of dipentaerythritol hexaacrylate that is the electromagnetic ray-curable compound include pentafluorophenyltrimethoxysilane, phenyltrimethoxysilane, nonafluoro-n-butylethyldimethoxysilane, diphenyldimethoxysilane, 3-(meth)acryloxy-n-propyltrimethoxysilane, 3-(3-methyl-3-oxetanemethoxy)-n-propyltrimethoxysilane, oxacyclohexyltrimethoxysilane, 2-(3,4-epoxycyclohexyl)ethyltrimethoxysilane, 3-glycidyloxy-n-propyltrimethoxysilane, 3-glycidyloxy-n-propylmethyldiethoxysilane, 3-glycidyloxy-n-propyltriethoxysilane, p-styryltrimethoxysilane, 3-methacryloxy-n-propylmethyldimethoxysilane, 3-methacryloxy-n-propyltrimethoxysilane, 3-methacryloxy-n-propylmethyldiethoxysilane, 3-methacryloxy-n-propyltriethoxysilane, 3-acryloxy-n-propyltrimethoxysilane, N-(2-aminoethyl)-3-amino-n-propylmethyldimethoxysilane, N-(2-aminoethyl)-3-amino-n-propyltrimethoxysilane, N-(2-aminoethyl)-3-amino-n-propyltriethoxysilane, 3-amino-n-propyltrimethoxysilane, 3-amino-n-propyltriethoxysilane, 3-(N-(1,3-dimethyl-butylidene)amino-n-propyltriethoxysilane, N-phenyl-3-amino-n-propyltrimethoxysilane, and organic silicon compounds having a group consisting of a polymer of a hydrocarbon (all of these have an SP value of larger than 8.4).

In addition, examples of the organic silicon compounds having a group consisting of a polymer of a hydrocarbon can include (meth)acrylates, such as methyl(meth)acrylate, ethyl (meth)acrylate, butyl(meth)acrylate, 2-ethylhexyl(meth) acrylate, and cyclohexyl(meth)acrylate; carboxylic acids, such as (meth)acrylic acid, itaconic acid, and fumaric acid, and acid anhydrides, such as maleic anhydride; epoxy compounds, such as glycidyl(meth)acrylate; amino compounds, such as diethylaminoethyl(meth)acrylate and aminoethyl vinyl ether; amide compounds, such as (meth)acrylamide, itaconic acid diamide, α-ethylacrylamide, crotonamide, fumaric acid diamide, maleic acid diamide, and N-butoxymethyl(meth)acrylamide; and organic silicon compounds comprising as the R component in formula (I) a vinyl-based polymer obtained by copolymerizing a vinyl-based compound selected from acrylonitrile, styrene, α-methylstyrene, vinyl chloride, vinyl acetate, vinyl propionate, and the like.

The organic silicon compound used is preferably a condensate, and its average particle diameter is preferably 50 nm or less, more preferably 20 nm or less.

The amount of the organic silicon compound and/or the condensate thereof in the solids of the organic-inorganic complex-forming composition of the present invention is 1 to 95% by mass, preferably 1 to 50% by mass, based on the total mass of the solids.

(Electromagnetic Ray-Curable Compound)

The electromagnetic ray-curable compound of the present invention means a compound or a resin having a functional group that undergoes a polymerization reaction by irradiation with electromagnetic rays in the presence of a photopolymerization initiator. As the electromagnetic rays used, ultraviolet-rays, X-rays, radiation, ionizing radiation, and ionizing radiation (α, β, and γ-rays, neutron beams, and electron beams) can be used, and light including a wavelength of 350 nm or less is preferred.

The irradiation with electromagnetic rays can be performed using a known apparatus such as an ultrahigh pressure mercury lamp, a high pressure mercury lamp, a low pressure mercury lamp, a metal halide lamp, an excimer lamp, a carbon arc lamp, or a xenon arc lamp. The source of light for irradiation is preferably a source of light comprising light having any wavelength in the range of 150 to 350 nm, more preferably a source of light comprising light having any wavelength in the range of 250 to 310 nm.

In addition, the amount of irradiation light of light for irradiation for sufficiently curing the organic-inorganic complex-forming composition is, for example, about 0.1 to 100 J/cm$^2$, and is preferably about 1 to 10 J/cm$^2$, more preferably about 1 to 5 J/cm$^2$, considering film curing efficiency (the relationship between irradiation energy and the extent of film curing).

As the electromagnetic ray-curable compound, specifically, (meth)acrylate-based compounds, epoxy resins, vinyl compounds excluding acrylate-based compounds, and the like can be illustrated. The number of functional groups is not particularly limited as long as it is one or more.

Examples of the acrylate-based compounds include polyurethane(meth)acrylate, polyester(meth)acrylate, epoxy (meth)acrylate, polyamide(meth)acrylate, polybutadiene (meth)acrylate, polystyryl(meth)acrylate, polycarbonate diacrylate, tripropylene glycol di(meth)acrylate, hexanediol di(meth)acrylate, trimethylolpropane tri(meth)acrylate, pentaerythritol tri(meth)acrylate, and siloxane polymers having a (meth)acryloyloxy group. Polyester(meth)acrylate, polyurethane(meth)acrylate, and epoxy poly(meth)acrylate are preferred, and polyurethane(meth)acrylate is more preferred.

There is no limit to molecular weight as long as the acrylate-based compound is dissolved in the organic-inorganic complex-forming composition. Usually, the mass average molecular weight is 500 to 50,000, preferably 1,000 to 10,000.

The epoxy(meth)acrylate can be obtained, for example, by the esterification reaction of the oxirane ring of a low molecular weight bisphenol type epoxy resin or novolac epoxy resin with acrylic acid.

The polyester(meth)acrylate is obtained, for example, by esterifying with acrylic acid the hydroxyl groups of a polyester oligomer having hydroxyl groups at both ends, obtained by the condensation of a polyvalent carboxylic acid and a polyhydric alcohol. Alternatively, the polyester(meth)acrylate is obtained by esterifying with acrylic acid a hydroxyl group at an end of an oligomer obtained by adding an alkylene oxide to a polyvalent carboxylic acid.

The urethane(meth)acrylate is the reaction product of an acrylate monomer having a hydroxyl group and an isocyanate compound obtained by reacting a polyol with a diisocyanate. Examples of the polyol include polyester polyols, polyether polyols, and polycarbonate diols.

Examples of commercial products of the urethane(meth) acrylate used in the present invention can include trade names: BEAMSET 102, 502H, 505A-6, 510, 550B, 551B, 575, 575CB, EM-90, and EM92 manufactured by Arakawa Chemical Industries, Ltd., trade names: Photomer 6008 and 6210 manufactured by SAN NOPCO LIMITED, trade names: NK Oligo U-2PPA, U-4HA, U-6HA, H-15HA, UA-32PA, U-324A, U-4H, and U-6H manufactured by Shin Nakamura Chemical Co., Ltd., trade names: ARONIX M-1100, M-1200, M-1210, M-1310, M-1600, and M-1960 manufactured by TOAGOSEI CO., LTD., trade names: AH-600, AT606, and UA-306H manufactured by Kyoeisha Chemical Co., Ltd., trade names: KAYARAD UX-2201, UX-2301, UX-3204, UX-3301, UX-4101, UX-6101, and UX-7101 manufactured by Nippon Kayaku Co., Ltd., trade names: SHIKOH UV-1700B, UV-3000B, UV-6100B, UV-6300B, UV-7000, UV-7600B, and UV-2010B manufactured by The Nippon Synthetic Chemical Industry Co., Ltd., trade names: Art Resin UN-1255, UN-5200, HDP-4T, HMP-2, UN-901T, UN-3320HA, UN-3320HB, UN-3320HC, UN-3320HS, H-61, and HDP-M20 manufactured by Negami Chemical Industrial Co., Ltd, and trade names: Ebecryl 6700, 204, 205, 220, 254, 1259, 1290K, 1748, 2002, 2220, 4833, 4842, 4866, 5129, 6602, and 8301 manufactured by Daicel-UCB Company, Ltd.

In addition, the vinyl compounds excluding acrylate-based compounds include N-vinylpyrrolidone, N-vinylcaprolactam, vinyl acetate, styrene, and unsaturated polyesters. Examples of the epoxy resins can include hydrogenated bisphenol A diglycidyl ether, 3,4-epoxycyclohexylmethyl-3,4-epoxycyclohexane carboxylate, 2-(3,4-epoxycyclohexyl-5,5-spiro-3,4-epoxy)cyclohexane-meta-dioxane, and bis(3,4-epoxycyclohexylmethyl)adipate.

The amount of the blended electromagnetic ray-curable compound in the solids of the organic-inorganic complex-forming composition of the present invention is 2 to 98% by mass, preferably 50 to 98% by mass, based on the total mass of the solids.

(Photopolymerization Initiator)

Examples of the photopolymerization initiator of the present invention can include (a) compounds that generate a cationic species by light irradiation, and (b) compounds that generate an active radical species by light irradiation.

Preferred examples of the compounds that generate a cationic species by light irradiation can include onium salts having a structure represented by the following formula (II). The onium salts are compounds that release a Lewis acid by receiving light.

$$[R^1_a R^2_b R^3_c R^4_d W]^{+e}[ML_{e+f}]^{-e} \qquad (II)$$

(wherein the cation represents an onium ion, W represents S, Se, Te, P, As, Sb, Bi, O, I, Br, Cl, or N≡N—, $R^1$, $R^2$, $R^3$ and $R^4$ each represent the same or different organic group, a, b, c, and d each represent an integer of 0 to 3, and (a+b+c+d) is equal to the valence of W; M represents a metal or a metalloid constituting the center atom of the halide complex $[ML_{e+f}]$, for example, B, P, As, Sb, Fe, Sn, Bi, Al, Ca, In, Ti, Zn, Sc, V, Cr, Mn, or Co; and L represents a halogen atom, for example, F, Cl, or Br, e represents the net charge of the halide complex ion, and f represents the valence of M)

Specific examples of the anion ($ML_{e+f}$) in the above formula (II) can include tetrafluoroborate ($BF_4^-$), hexafluorophosphate ($PF_6^-$), hexafluoroantimonate ($SbF_6^-$), hexafluoroarsenate ($AsF_6^-$), and hexachloroantimonate ($SbCl_6^-$).

In addition, onium salts having an anion represented by the formula $[ML_f(OH)^-]$ can also be used. Further, onium salts having other anions, such as a perchlorate ion ($ClO_4^-$), a trifluoromethanesulfonate ion ($CF_3SO_3^-$), a fluorosulfonate ion ($FSO_3^-$), a toluenesulfonate ion, a trinitrobenzenesulfonate ion, and a trinitrotoluenesulfonate ion, may be used. One of these can be used alone, or two or more of these can be used in combination.

Examples of the compounds that generate an active radical species by light irradiation can include acetophenone, acetophenone benzyl ketal, 1-hydroxycyclohexyl phenyl ketone, 2,2-dimethoxy-1,2-diphenylethan-1-one, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2-benzyl-2-dimethylamino-1-(4-morpholinophenyl)-butanone-1,4-(2-hydroxyethoxy)phenyl-(2-hydroxy-2-propyl)ketone, 2,4,6-trimethylbenzoyldiphenylphosphine oxide, bis-(2,6-dimethoxybenzoyl)-2,4,4-trimethylpentylphosphine oxide, and oligo(2-hydroxy-2-methyl-1-(4-(1-methylvinyl)phenyl) propanone).

The amount of the photopolymerization initiator used in the present invention is preferably 0.01 to 20% by mass, further preferably 0.1 to 10% by mass, based on the solids of the (meth)acrylate-based electromagnetic ray-curable compound.

In the present invention, a sensitizer can be added as required. For example, trimethylamine, methyldimethanolamine, triethanolamine, p-dimethylaminoacetophenone, ethyl p-dimethylaminobenzoate, isoamyl p-dimethylaminobenzoate, N,N-dimethylbenzylamine, and 4,4'-bis(diethylamino)benzophenone can be used.

(Metal Compound Particles)

The metal compound particles of the present invention are not particularly limited as long as they can form an unevenness on the surface of the formed organic-inorganic complex film to some extent. Specifically, aggregative metal compound particles, metal compound particles having a relatively large particle diameter, and the like can be illustrated, and a mixture of metal compound particles having an isoelectric point of less than 5 as a metal oxide and metal compound particles having an isoelectric point of larger than 5 as a metal oxide is preferred.

Examples of the metal of the metal compound particles having an isoelectric point of less than 5 as a metal oxide include silicon, tungsten, and antimony. Examples of the metal compound include metal oxides, such as silica, tungsten oxide, and antimony oxide.

On the other hand, examples of the metal of the metal compound particles having an isoelectric point of 5 or more as a metal oxide include zirconium, aluminum, titanium, magnesium, iron, tin, zinc, cadmium, nickel, copper, berium, ruthenium, thorium, yttrium, mercury, cesium, chromium, and lanthanum. Examples of the metal compound include metal oxides, such as zirconia, alumina, titania, magnesium oxide, tin oxide, zinc oxide, cadmium oxide, yttrium oxide, nickel oxide, copper oxide, berium oxide, ruthenium oxide, thorium oxide, mercury oxide, cerium oxide, and chromium oxide, and magnesium fluoride.

The metal compound particles are preferably a mixed sol of silica and at least one selected from zirconia, alumina, and titania, more preferably a mixed sol of a silica sol and a zirconia sol.

The mixing proportion of the metal compound particles having an isoelectric point of less than 5 as a metal oxide to the metal compound particles having an isoelectric point of 5 or more is 1:99 to 99:1, preferably 50:50 to 99:1, and more preferably 80:20 to 99:1, in terms of the weight ratio of the solids.

The metal compound particles used are not particularly limited whether they are secondary particles or primary particles. The metal compound particles are preferably primary particles.

The particle diameter of the metal compound is not particularly limited. The average primary particle diameter is preferably in the range of 1 nm to 100 nm, further preferably in the range of 1 nm to 50 nm.

In addition, the properties and state of the metal compound particles may be a sol or a powder, and usually, a sol is preferably used. A sol is usually a colloidal dispersion solution, and therefore, a uniform dispersion solution can be easily made by simply mixing the sol with another component. In addition, the problem of becoming nonuniform due to settling or the like is a little.

In addition, metal compound particles whose surface is surface-modified with a silane coupling agent or the like can be used. Specifically, a silica sol or the like subjected to hydrophobic treatment with hydrocarbon groups or the like can be illustrated.

The amount of the blended metal compound particles in the solids of the organic-inorganic complex-forming composition of the present invention is 0.1 to 50% by mass, preferably 0.1 to 25% by mass, based on the total mass of the solids.

(Silanol Condensation Catalyst)

The condensate of an organic silicon compound of the present invention can be obtained by subjecting the organic silicon compound of formula (I) to a condensation reaction using a silanol condensation catalyst.

Here, the silanol condensation catalyst is not particularly limited as long as it hydrolyzes the hydrolyzable group in the compound represented by formula (I), and condenses the silanol to form a siloxane bond. Examples of the silanol condensation catalyst include a metal chelate compounds, organic acid metal salts, metal compounds having two or more hydroxyl groups or hydrolyzable groups (excluding metal chelate compounds and organic acid metal salts), hydrolysates thereof, and condensates thereof, acids, and bases. One silanol condensation catalyst can be used alone, or two or more silanol condensation catalysts can be used in combination.

The above metal chelate compounds are preferably metal chelate compounds having a hydroxyl group or a hydrolyzable group, more preferably metal chelate compounds having two or more hydroxyl groups or hydrolyzable groups. Having two or more hydroxyl groups or hydrolyzable groups means that the total of hydrolyzable groups and hydroxyl groups is 2 or more. In addition, as the above metal chelate compounds, β-ketocarbonyl compounds, β-ketoester compounds, and α-hydroxyester compounds are preferred. Specific examples of the above metal chelate compounds include β-ketoesters, such as methyl acetoacetate, n-propyl acetoacetate, isopropyl acetoacetate, n-butyl acetoacetate, sec-butyl acetoacetate, and t-butyl acetoacetate; β-diketones, such as acetylacetone, hexane-2,4-dione, heptane-2,4-dione, heptane-3,5-dione, octane-2,4-dione, nonane-2,4-dione, and 5-methyl-hexane-2,4-dione; and compounds in which hydroxycarboxylic acids, such as glycolic acid and lactic acid, or the like are coordinated.

The above organic acid metal salts are compounds consisting of salts obtained from metal ions and organic acids. Examples of the organic acids include organic compounds that exhibit acidity, such as carboxylic acids, such as acetic acid, oxalic acid, tartaric acid, and benzoic acid; sulfur-containing organic acids, such as sulfonic acid and sulfinic acid; phenol compounds; enol compounds; oxime compounds; imide compounds; and aromatic sulfonamides.

In addition, the above metal compounds having two or more hydroxyl groups or hydrolyzable groups are those other than the above metal chelate compounds and organic acid metal salts. Examples of the above metal compounds having two or more hydroxyl groups or hydrolyzable groups can include metal alcoholates, such as metal hydroxides, metal propoxides, metal isopropoxides, and metal n-butoxides.

Examples of the hydrolyzable groups in the above metal compounds, the above metal chelate compounds, or the above organic acid metal salts include alkoxy groups, acyloxy groups, halogen groups, and isocyanate groups. Alkoxy groups having 1 to 4 carbon atoms and acyloxy groups having 1 to 4 carbon atoms are preferred. Having two or more hydroxyl groups or hydrolyzable groups means that the total of hydrolyzable groups and hydroxyl groups is 2 or more.

The hydrolysate and/or condensate of such a metal compound is preferably one obtained by hydrolyzing 1 mole of the metal compound having two or more hydroxyl groups or hydrolyzable groups, using 0.5 moles or more of water, more preferably one obtained by hydrolyzing 1 mole of the metal compound having two or more hydroxyl groups or hydrolyzable groups, using 0.5 to 2 moles of water.

In addition, the hydrolysate and/or condensate of the metal chelate compound is preferably one obtained by hydrolyzing 1 mole of the metal chelate compound using 5 to 100 moles of water, more preferably one obtained by hydrolyzing 1 mole of the metal chelate compound using 5 to 20 moles of water.

In addition, the hydrolysate and/or condensate of the organic acid metal salt is preferably one obtained by hydrolyzing 1 mole of the organic acid metal salt using 5 to 100 moles of water, more preferably one obtained by hydrolyzing 1 mole of the metal organic acid salt using 5 to 20 moles of water.

In addition, examples of metals in these metal compounds, metal chelate compounds, or organic acid metal salt compounds include titanium (Ti), zirconium (Zr), aluminum (Al), silicon (Si), germanium (Ge), indium (In), tin (Sn), tantalum (Ta), zinc (Zn), tungsten (W), and lead (Pb). Among these, titanium (Ti), zirconium (Zr), aluminum (Al), and tin (Sn) are preferred, and particularly, titanium (Ti) is preferred. One of these may be used alone, or two or more of these can also be used.

When the above metal compounds are used as the silanol condensation catalyst, a hydrolysate and/or a condensate is preferable, particularly preferable is a hydrolysate and/or condensate of a metal chelate compound, and its average particle diameter is preferably 20 nm or less, more preferably 10 nm or less. Thus, the transparency of the organic-inorganic complex (organic-inorganic complex thin film) can be improved.

Examples of the acids include organic acids and mineral acids. Specific examples of the organic acids include acetic acid, formic acid, oxalic acid, carbonic acid, phthalic acid, trifluoroacetic acid, p-toluenesulfonic acid, and methanesulfonic acid. Specific examples of the mineral acids include hydrochloric acid, nitric acid, boric acid, and hydrofluoboric acid.

Here, the acids encompass photo-acid-generating agents that generate an acid by light irradiation, specifically, diphenyliodonium hexafluorophosphate, triphenylphosphonium hexafluorophosphate, and the like.

Examples of the bases include strong bases, such as tetramethylguanidine and tetramethylguanidylpropyltrimethoxysilane; organic amines, carboxylic acid-neutralized salts of organic amines, and quaternary ammonium salts.

The blending ratio of the silanol condensation catalyst in the organic-inorganic complex-forming composition of the present invention is 1:99 to 99:1, preferably 1:99 to 50:50, based on the mass of the organic silicon compound and/or the condensate thereof.

(Other Components that can be Contained)

The solvent used in the present invention is not particularly limited. Examples of the solvent include aromatic hydrocarbons, such as benzene, toluene, and xylene; aliphatic hydrocarbons, such as hexane and octane; alicyclic hydrocarbons, such as cyclohexane and cyclopentane; ketones, such as acetone, methyl ethyl ketone, and cyclohexanone; ethers, such as tetrahydrofuran and dioxane; esters, such as ethyl acetate and butyl acetate; amides, such as N,N-dimethylformamide and N,N-dimethylacetamide; sulfoxides, such as dimethyl sulfoxide; alcohols, such as methanol and ethanol; and polyhydric alcohol derivatives, such as ethylene glycol monomethyl ether and ethylene glycol monomethyl ether acetate. One of these solvents can be used alone, or two or more of these solvents can be used in combination.

In addition, it is also possible to separately add and disperse a filler in the organic-inorganic complex-forming composition of the present invention in order to exhibit properties, such as the coloration of the obtained coating film, film thickening, the prevention of the transmission of ultraviolet rays to the base, the provision of anticorrosiveness, and heat resistance.

Examples of this filler include water-insoluble pigments, such as organic pigments and inorganic pigments, or particulate, fibrous, or scaly metals and alloys and oxides, hydroxides, carbides, nitrides, and sulfides thereof other than pigments. Specific examples of this filler can include particulate, fibrous, or scaly iron, copper, aluminum, nickel, silver, zinc, ferrite, carbon black, stainless steel, silicon dioxide, titanium oxide, aluminum oxide, chromium oxide, manganese oxide, iron oxide, zirconium oxide, cobalt oxide, synthetic mullite, aluminum hydroxide, iron hydroxide, silicon carbide, silicon nitride, boron nitride, clay, diatomaceous earth, slaked lime, gypsum, talc, barium carbonate, calcium carbonate, magnesium carbonate, barium sulfate, bentonite, mica, zinc green, chromium green, cobalt green, viridian, guinea green, cobalt chromium green, Scheele's green, green earth, manganese green, pigment green, ultramarine blue, Prussian blue, blue verditer, cobalt blue, cerulean blue, copper borate, molybdenum blue, copper sulfide, cobalt violet, Mars violet, manganese violet, pigment violet, lead suboxide, calcium plumbate, zinc yellow, lead sulfide, chromium yellow, ocher, cadmium yellow, strontium yellow, titanium yellow, litharge, pigment yellow, cuprous oxide, cadmium red, selenium red, chromium vermilion, red oxide, zinc white, antimony white, basic lead sulfate, titanium white, lithopone, lead silicate, zircon oxide, tungsten white, lead flowers of zinc, Bantison white, lead phthalate, manganese white, lead sulfate, graphite, bone black, diamond black, thermatomic black, vegetable black, potassium titanate whiskers, and molybdenum disulfide.

In addition, additives, such as known dehydrators, such as methyl orthoformate, methyl orthoacetate, and tetraethoxysilane, various surfactants, and silane coupling agents, titanium coupling agents, dyes, dispersing agents, thickening agents, and leveling agents other than the above can also be added to the organic-inorganic complex-forming composition of the present invention.

(Method for Preparing Organic-Inorganic Complex-Forming Composition)

As a method for preparing the organic-inorganic complex-forming composition of the present invention, an organic silicon compound, a silanol condensation catalyst, an electromagnetic ray-curable compound, and metal compound particles are mixed, with water and/or a solvent and other components that can be contained added as required.

Specifically, for example, a silanol condensation catalyst is mixed with a solvent, a predetermined amount of water is added for (partial) hydrolysis, and then, an organic silicon compound is added for (partial) hydrolysis. On the other hand, an electromagnetic ray-curable compound is dissolved in a solvent, a photopolymerization initiator is added, and then, both solutions are mixed.

These four components can also be simultaneously mixed. In addition, examples of the method for mixing the organic silicon compound and the silanol condensation catalyst can include a method of mixing the organic silicon compound and the silanol condensation catalyst and then adding water for (partial) hydrolysis, and a method of mixing a (partial) hydrolysate obtained by separately (partially) hydrolyzing the organic silicon compound and the silanol condensation catalyst. It is not always necessary to add water or a solvent, but it is preferred to add water to provide a (partial) hydrolysate. Although the amount of the predetermined amount of water depends on the type of the silanol condensation catalyst, for example, when the silanol condensation catalyst is a metal compound having two or more hydroxyl groups or hydrolyzable groups, 0.5 moles or more of water is preferably used, and 0.5 to 2 moles of water is more preferably used, based on 1 mole of the metal compound. In addition, when the silanol condensation catalyst is a metal chelate compound or an organic acid metal salt compound, 5 to 100 moles of water is preferably used, and 5 to 20 moles of water is more preferably used, based on 1 mole of the metal chelate compound or the organic acid metal salt compound.

Metal compound particles can be added at the end of the above step. Specifically, for example, the particles may be directly added to the solution prepared in the above step, or after being dispersed in an organic solvent, such as an alcohol. After the addition, the mixture can be stirred to provide the organic-inorganic complex-forming composition of the present invention.

(Application of Organic-Inorganic Complex-Forming Composition)

Examples of substrates on which the organic-inorganic complex of the present invention can be formed include metals, ceramics, glass, and plastics. Among these, preferred examples include plastics, and specific examples include plastic substrates for touch panels. Conventionally, the formation of a thin film on a plastic substrate has been difficult, and the substrates have been limited to inorganic substrates, such as glass. But, the thin film of the present invention can be easily formed as a coating even on plastic substrates on which it is difficult to form a thin film, and the thin film of the present invention is also suitable for plastic optical components. Examples of such plastics include polycarbonate resins, acrylic resins, polyimide resins, polyester resins, epoxy resins, liquid crystal polymer resins, and polyethersulfones.

In addition, as a method for applying the organic-inorganic complex-forming composition, known application methods can be used. Examples of the method can include dipping methods, spraying methods, bar coating methods, roll coating methods, spin coating methods, curtain coating methods, gravure printing methods, silk screen methods, and ink jet methods. In addition, the thickness of the formed film is not particularly limited, and is, for example, about 0.05 to 200 μm.

The drying treatment of the film formed by applying the organic-inorganic complex-forming composition is, for example, preferably performed at 40 to 200° C. for about 1 to 120 minutes, more preferably at 60 to 120° C. for about 10 to 60 minutes.

(Method for Producing Organic-Inorganic Complex)

Examples of a method for producing the organic-inorganic complex of the present invention can include a method of irradiating the above organic-inorganic complex-forming composition with light including a wavelength of 350 nm or less.

The irradiation with light including a wavelength of 350 nm or less can be performed using, for example, a known apparatus, such as a high pressure mercury lamp, a low pressure mercury lamp, a metal halide lamp, or an excimer lamp. The light for irradiation is preferably light comprising light having any wavelength in the range of 150 to 350 nm, more preferably light comprising light having any wavelength in the range of 250 to 310 nm. Materials that are sensitive to wavelengths in such a range and do not react to light of more than 350 nm, preferably 310 nm, are hardly affected by sunlight. In addition, the amount of irradiation light of light for irradiation is, for example, about 0.1 to 100 J/cm², and is preferably about 0.2 to 20 J/cm², more preferably about 0.5 to 10 J/cm², considering film curing efficiency (the relationship between irradiation energy and the extent of film curing).

The irradiation with light having a wavelength of 350 nm or less refers to irradiation using a source of light comprising light having any wavelength of 350 nm or less as a component, preferably, irradiation using a source of light comprising light having any wavelength of 350 nm or less as the main component.

(Organic-Inorganic Complex)

The organic-inorganic complex of the present invention comprises:

a) a condensate of at least one organic silicon compound represented by formula (I):

$$R_nSiX_{4-n} \qquad (I)$$

(wherein R represents an organic group having a carbon atom directly bonded to Si, and X represents a hydroxyl group or a hydrolyzable group; and n represents 1 or 2, wherein when n is 2, each R is the same or different, and when (4−n) is 2 or more, each X is the same or different), and wherein a molar ratio of an organic silicon compound in which the solubility parameter of R (SP1) obtained by the Fedors' estimation method is smaller than the solubility parameter of the electromagnetic ray-curable compound (SP2) obtained by the Fedors' estimation method and the difference between the SP1 and the SP2 is 2.0 or more (Si1) to the organic silicon compound in which SP1 is smaller than SP2 and the difference between the SP1 and the SP2 is less than 2.0 or the organic silicon compound in which SP1 is larger than SP2 (Si2) (Si1:Si2) is in the range of 8:2 to 10:0;

b) a cured product of an electromagnetic ray-curable compound; and c) aggregates of metal compound particles.

The organic silicon compound or the condensate thereof, the electromagnetic ray-curable compound, and the metal compound particles in the organic-inorganic complex-forming composition that is the raw material become the condensate of the organic silicon compound, a cured product of the electromagnetic ray-curable compound, and aggregates of the metal compound particles, respectively, in the organic-inorganic complex. When the metal compound particles in the organic-inorganic complex-forming composition are a sol, such as a silica sol or titania sol, they become a gel in the organic-inorganic complex.

Silanol condensation catalysts other than volatile ones, such as acids, also remain in the organic-inorganic complex of the present invention. The remaining form encompasses those in which a silanol condensation catalyst and/or a derivative thereof is dispersed in a non-bonded state in a condensate of an organic silicon compound, those in which a silanol condensation catalyst and/or a derivative thereof is bonded to a condensate of an organic silicon compound (for example, those having a Si—O—M bond (M represents a metal atom in a silanol condensation catalyst)), and those consisting of a mixed state thereof.

The content of the above components is similar to the blending proportion of the components in the solids of the organic-inorganic complex-forming composition.

The organic-inorganic complex of the present invention contains metal compound particles, and therefore, its surface is not smooth and has an unevenness. In addition, the haze value is 5% or less, preferably 2.0% or less, and further preferably 1.5% or less.

In the present invention, the haze value indicates the proportion of scattered light to total transmitted light. A lower haze value indicates being more transparent.

The haze value of the film can be measured using a haze meter (manufactured by Nippon Denshoku Industries Co., Ltd.).

EXAMPLES

The present invention will be more specifically described below by Examples, but the technical scope of the present invention is not limited to these illustrations.

Example 1

1. Synthesis of Silanol Condensation Catalyst (Photosensitive Compound)

212 g of titanium diisopropoxybisacetylacetonate (the amount of solids in terms of titanium oxide: 16.5% by weight) was dissolved in 410 g of a mixed solvent of ethanol/a lower alcohol/water=86:13.8:0.2, and then, 79 g (10 times moles/the moles of titanium oxide) of ion-exchange water was added with stirring. This solution was stirred for 2 hours, while being heated to 40° C., for hydrolysis. Next, the solution was filtered to obtain a yellow transparent nanodispersion solution of titanium oxide having a concentration of 5% by weight in terms of titanium oxide [A-1]. The titanium oxide had an average particle diameter of 4.1 nm, and was monodisperse.

2. Preparation of Organic Silicon Compound

Liquids [B-1] to [B-2] obtained by mixing vinyltrimethoxysilane (VTMS) (the SP value of $CH_2$=$CHSiO_{1.5}$: 7.00) and 3-methacryloxypropyltrimethoxysilane (MPTMS) (the SP value of $(CH2$=$CH(CH_3)C(\!\!=\!\!O)O\!\!-\!\!(CH_2)_3SiO_{1.5}$: 9.48) as organic silicon compounds in amounts shown in Table 1 so that mass ratios shown in Table 1 were obtained were used.

Next, [A-1] and [B-1] to [B-2] were mixed in amounts shown in Table 1 so that an element ratio (Ti/Si=1/9) was obtained. Ion-exchange water was further added in amounts shown in Table 1 (2 times moles/the moles of the organic silicon compounds), and the solutions were stirred at room temperature for 10 hours to prepare solutions [C-1] to [C-2].

TABLE 1

|  | Mass ratio VTMS/ MPTMS | VTMS (g) | MPTMS (g) |  | [A-1] (g) | H₂O (g) |
|---|---|---|---|---|---|---|
| [C-1] | 10/0 | 287 | 0.00 | [B-1] | 344 | 69.9 |
| [C-2] | 9/1 | 264 | 29.4 | [B-2] | 338 | 68.5 |

3. Adjustment of Organic-Inorganic Complex-Forming Compositions

To an urethane acrylate oligomer solution in which the solids were 55% by weight, as an electromagnetic ray-curable compound, [C-1] to [C-2] were added, with stirring, in amounts shown in Table 2 so that the proportions of the solids of the electromagnetic ray-curable compound and [C-1] to [C-2] were 90/10 in terms of mass ratio, and the solutions were stirred for 30 minutes. Then, 2-methyl-1-(4-methylthiophenyl)-2-morpholinopropan-1-one as a photopolymerization initiator was added in amounts shown in Table 2 so that the 2-methyl-1-(4-methylthiophenyl)-2-morpholinopropan-1-one was 4% by mass based on the solids of the urethane acrylate oligomer, and the solutions were further stirred at room temperature for 30 minutes to prepare solutions [D-1] to [D-2].

TABLE 2

|  | [C-1]-[C-2] (g) | Urethane acrylic oligomer (g) | Photopolymerization initiator (g) |
|---|---|---|---|
| [D-1] | [C-1]/138 | 550 | 12.1 |
| [D-2] | [C-2]/132 | 555 | 12.2 |

As metal oxides, an organosilica sol (average primary particle diameter: 50 nm) was added in an amount of 8% by mass as solids, based on the solids of [D-1] to [D-2], to the above prepared solutions [D-1] to [D-2], with stirring, and then, a zirconia sol (average primary particle diameter: 20 nm) was added in an amount of 2% by mass as solids, based on the solids of [D-1] to [D-2], to prepare organic-inorganic complex-forming solutions [E-1] to [E-2].

Example 2

Methyltrimethoxysilane (the SP value of $CH_3SiO_{1.5}$: 5.80) and n-propyltriethoxysilane (the SP value of $CH_3(CH_2)_2SiO_{1.5}$: 7.28) were used instead of VTMS in [C-1] in the preparation of the [E-1] of Example 1, and others were prepared as in Example 1 to prepare organic-inorganic complex-forming solutions [E-3] to [E-4].

Comparative Example 1

Operation was performed as in Example 1 except that in Example 1, the mass ratios of VTMS to MPTMS were changed to ratios shown in the following Table 3 to prepare organic-inorganic complex-forming solutions [RE-1] to [RE-2] through [RD-1] and [RD-2] described in Table 4.

TABLE 3

|  | Mass ratio VTMS/MPTMS | VTMS (g) | MPTMS (g) |  | [A-1] (g) | $H_2O$ (g) |
|---|---|---|---|---|---|---|
| [RC-1] | 7/3 | 216 | 92.7 | [B-3] | 325 | 66.0 |
| [RC-2] | 5/5 | 163 | 163 | [RB-2] | 311 | 63.2 |

TABLE 4

|  | [RC-1]-[RC-2] (g) | Urethane acrylic oligomer (g) | Photopolymerization initiator (g) |
|---|---|---|---|
| [RD-1] | [RC-1]/122 | 566 | 12.5 |
| [RD-2] | [RC-2]/112 | 576 | 12.7 |

Comparative Example 2

3-Glycidyloxy-n-propyltrimethoxysilane (the SP value of 3-glycidyloxy-n-propyl $SiO_{1.5}$: 9.29), methacryloxypropyltrimethoxysilane (MPTMS, the SP value of methacryloxypropyl $SiO_{1.5}$: 9.48), acryloxypropyltrimethoxysilane (the SP value of acryloxypropyl $SiO_{1.5}$: 9.44), and phenyltrimethoxysilane (the SP value of phenyl $SiO_{1.5}$: 10.34) were used instead of VTS in [C-1] in the preparation of the [E-1] of Example 1, and others were prepared as in Example 1 to prepare organic-inorganic complex-forming solutions [RE-3] to [RE-6].

Example 3

Organic-Inorganic Complex Formation

The organic-inorganic complex-forming solutions [E-1] to [E-4] were coated on 188 μm thick PET films (anti-interference fringe PET COSMOSHINE A4300-#100 manufactured by Toyobo Co., Ltd.) by a bar coater, and heated at 80° C. by a warm air circulation type dryer for 3 minutes. Then, the films were irradiated with ultraviolet rays in an accumulated amount of irradiation of 362 mJ/cm² (254 nm) by a condensing type high pressure mercury lamp (UV light comprising light having wavelengths of 365 nm, 313 nm, and 254 nm as the main component, manufactured by EYE GRAPHICS CO., LTD., one lamp type, 120 W/cm, lamp height: 9.8 cm, conveyor speed: 6 m/min) to obtain thin films [F-1] to [F-4].

Comparative Example 3

Operation was performed as in Example 3 except that as the organic-inorganic complex-forming solutions, [RE-1] to [RE-6] were used instead of [E-1] to [E-4] to obtain thin films [RF-1] to [RF-6].

[Evaluation of Thin Films]

For the above obtained thin films [F-1] to [F-4], and [RF-1] to [RF-6], the following evaluation was performed.

(1) Turbidity Measurement

Measurement was performed according to JIS K 7105. For the measurement, a haze meter NDH-300A manufactured by Nippon Denshoku Industries Co., Ltd. was used. The total light transmittance (TT) is the proportion (%) of the amount of all light that has passed through a sample, and is the sum of diffused light transmittance (DF) that is the proportion (%) of the amount of light diffused by the sample and parallel light transmittance that is the proportion (%) of the amount of light travelling in a straight line in the incident direction, when the intensity of incident light is 100%.

$(TT)=(DF)+$(parallel light transmittance)

In addition, the haze value (Hz) (%) is the proportion (%) of the amount of light that deviates from the incident beam and is diffusely transmitted while the incident light passes through the sample.

haze value $(Hz)=(DF)/(TT)\times 100$

The measurement was performed three to five times, and the average value was described in results.

(2) Specular Glossiness Measurement

Specular glossiness measurement was used as the evaluation of anti-glare (AG) performance. Generally, a sample having a glossiness of 110 or less at an acceptance angle of 60° can be determined to have AG performance. The smaller the value is, the higher the AG performance is. For the measurement, a measuring apparatus according to JIS K 7105, a product of Murakami Color Research Laboratory, a portable glossmeter GMX-202, was used. The measurement was performed at an acceptance angle of 60°.

(3) Evaluation of Whether Glare Occurred or not

The following three types of high definition displays having different dot pitch sizes were used.
  Dot pitch: 0.263 mm (personal computer display: 17 inch SXGA)
  Dot pitch: 0.152 mm (portable display: 2.8 inch Wide-QVGA)

Dot pitch: 0.08 mm (docomo cellular phone F-09A FUJITSU: 3.4 inch, resolution: 960 vertical pixels×480 horizontal pixels, definition: 315.68 ppi)

A film was affixed to a screen, a yellow-green screen was displayed on the screen, and the presence or absence of glare was visually evaluated. At this time, the film is adhered so that the AG layer is in contact with the liquid crystal display side. The visibility evaluator performs evaluation at all distances and all angles.

Very Good . . . No presence of glare

Good . . . To the extent that the presence of glare can be slightly recognized when looked at closely and carefully Fair . . . Better than Poor, but not to the extent of Good Poor . . . The presence of glare can be easily recognized (4) VertScan2.0 Measurement The surface shape observation of the obtained HC films was performed using VertScan2.0 (Ryoka Systems Inc.). The measurement conditions were CCD camera: "SONY HR-50 1/3," microscope objective lens: 20×, body tube: 1× Body, zoom lens: No Relay, wavelength filter: 520 nm, measurement mode: Wave, the size of the field of view: 640×480, scan range (μm): start 10 μm stop-10 μm, the number of effective pixels (%): 50, the average number of Phase: 1, contrast: 75 to 85, a screen of a plurality of fields of view, stitching: (the number in the X direction: 6, the number in the Y direction: 30), overlap rate (%): 20, and cutoff (λc) value: 80 μm.

Under the above conditions, mmd, wave.mmd, and rough.mmd were analyzed, and arithmetic average surface roughness (Sa) was calculated.

The above measurement results are shown in Table 5.

TABLE 5

| | Turbidity measurement | | | | | Dot pitch (mm) | | |
|---|---|---|---|---|---|---|---|---|
| | Hz (%) | TT (%) | DF (%) | Glossiness | Sa (μm) | 0.263 | 0.152 | 0.08 |
| [F-1] | 5.39 | 91.66 | 4.94 | 94.1 | 0.1734 | Very Good | Good | Fair |
| [F-2] | 4.39 | 91.49 | 4.02 | 103.3 | 0.1717 | Very Good | Good (Fair) | Fair |
| [F-3] | 19.91 | 88.9 | 17.7 | 47.2 | 0.2592 | Very Good | Good | Fair |
| [F-4] | 9.42 | 89.74 | 8.33 | 71.9 | 0.2207 | Very Good | Good | Poor |
| [RF-1] | 3.81 | 91.76 | 3.49 | 113.5 | 0.1406 | Very Good | Good (Fair) | Fair |
| [RF-2] | 1.57 | 92.02 | 1.44 | 131.1 | 0.1178 | Very Good | Fair | Poor |
| [RF-3] | 2.7 | 91.39 | 2.47 | 123.4 | 0.0959 | Very Good | Good (Fair) | Poor |
| [RF-4] | 1.5 | 91.8 | 1.37 | 144.1 | 0.0894 | Very Good | Good | Fair |
| [RF-5] | 1.56 | 91.85 | 1.43 | 144.8 | 0.0779 | Very Good | Good | Fair |
| [RF-6] | 2.11 | 92.07 | 1.94 | 136.2 | 0.0721 | Very Good | Very Good (Good) | Fair |

INDUSTRIAL APPLICABILITY

The present invention can provide an organic-inorganic complex in which the surface has very high hardness and the inside and the back surface side have appropriate hardness and which has excellent adhesiveness to a substrate and excellent moisture resistance, the organic-inorganic complex having anti-glare properties and preventing glare. Further, the organic-inorganic complex of the present invention can form a film which maintains high anti-glare properties and has a low haze value and high transparency because the amount of metal compound particles added can be reduced. In addition, the organic-inorganic complex of the present invention also has excellent anti-Newton ring properties.

The invention claimed is:

1. An organic-inorganic complex-forming composition comprising:

a) an electromagnetic ray-curable compound;

b) an organic silicon compound represented by formula (I):

$$R_n SiX_{4-n} \quad (I)$$

wherein R represents an organic group having a carbon atom directly bonded to Si, and X represents a hydroxyl group or a hydrolyzable group; and n represents 1 or 2, wherein when n is 2, each R is the same or different, and when (4−n) is 2 or more, each X is the same or different, and wherein the organic silicon compound is a mixture of an organic silicon compound (Si1) in which a solubility parameter of R obtained by a Fedors' estimation method (SP1) is smaller than a solubility parameter of the electromagnetic ray-curable compound (SP2) obtained by the Fedors' estimation method and a difference between the SP1 and the SP2 is 2.0 or more and an organic silicon compound (Si2) in which the SP1 of Si2 is smaller than the SP2 and a difference between the SP1 of Si2 and the SP2 is less than 2.0 or an organic silicon compound in which the SP1 of Si2 is larger than the SP2, wherein a molar ratio of organic silicon compounds Si1 and Si2 (Si1:Si2) is within the range of 8 or more to less than 10:2 or less to over 0, a condensate of the organic silicon compound, or a mixture of the organic silicon compound and the condensate;

and c) a mixture of metal compound particles having an isoelectric point of less than 5 as a metal oxide and metal compound particles having an isoelectric point of larger than 5 as a metal oxide.

2. The organic-inorganic complex-forming composition according to claim 1, wherein the electromagnetic ray-curable compound is 2 to 98% by mass based on a total mass of the solids.

3. The organic-inorganic complex-forming composition according to claim 1 or 2, wherein an average particle diameter of primary particles of the metal compound particles having an isoelectric point of less than 5 as a metal oxide and the metal compound particles having an isoelectric point of larger than 5 as a metal oxide is within the range of 1 to 100 nm.

4. The organic-inorganic complex-forming composition according to claim 1 or 2, wherein the mixing proportion of the metal compound particles having an isoelectric point of less than 5 as a metal oxide to the metal compound particles having an isoelectric point of larger than 5 as a metal oxide is 80:20 to 99:1, in terms of the weight ratio of the solids.

5. A laminate obtained by applying an organic-inorganic complex-forming composition according to claim 1 or 2 to a substrate.

6. An organic-inorganic complex comprising:
  a) a cured product of an electromagnetic ray-curable compound;
  b) a condensate of an organic silicon compound represented by formula (I):

$$R_n SiX_{4-n} \qquad (I)$$

wherein R represents an organic group having a carbon atom directly bonded to Si, and X represents a hydroxyl group or a hydrolyzable group; and n represents 1 or 2,
  wherein when n is 2, each R is the same or different, and when (4−n) is 2 or more, each X is the same or different, and
  wherein the organic silicon compound is a mixture of an organic silicon compound (Si1) in which a solubility parameter of R obtained by a Fedors' estimation method (SP1) is smaller than a solubility parameter of the electromagnetic ray-curable compound (SP2) obtained by the Fedors' estimation method and a difference between the SP1 and the SP2 is 2.0 or more and an organic silicon compound (Si2) in which the SP1 of Si2 is smaller than the SP2 and a difference between the SP1 of Si2 and the SP2 is less than 2.0 or an organic silicon compound in which the SP1 of Si2 is larger than the SP2,
  wherein a molar ratio of organic silicon compounds Si1 and Si2 (Si1:Si2) is within the range of 8 or more to less than 10:2 or less to over 0, and
  c) aggregates of a mixture of metal compound particles having an isoelectric point of less than 5 as a metal oxide and metal compound particles having an isoelectric point of larger than 5 as a metal oxide.

7. The organic-inorganic complex according to claim 6, wherein the cured product of the electromagnetic ray-curable compound is 2 to 98% by mass based on a total mass of the solids.

8. The organic-inorganic complex according to claim 6 or 7, wherein an average particle diameter of primary particles of the metal compound particles having an isoelectric point of less than 5 as a metal oxide and the metal compound particles having an isoelectric point of larger than 5 as a metal oxide is within the range of 1 to 100 nm.

9. The organic-inorganic complex according to claim 6 or 7, wherein the mixing proportion of the metal compound particles having an isoelectric point of less than 5 as a metal oxide to the metal compound particles having an isoelectric point of larger than 5 as a metal oxide is 80:20 to 99:1, in terms of the weight ratio of the solids.

* * * * *